(12) United States Patent
Chen et al.

(10) Patent No.: US 8,218,565 B2
(45) Date of Patent: Jul. 10, 2012

(54) ALTERNATING SCHEDULING METHOD FOR USE IN A MESH NETWORK

(75) Inventors: Jian Feng Chen, Beijing (CN); Cai Xia Chi, Beijing (CN)

(73) Assignee: Alcatel Lucent, Paris (FR)

( * ) Notice: Subject to any disclaimer, the term of this patent is extended or adjusted under 35 U.S.C. 154(b) by 1054 days.

(21) Appl. No.: 11/567,297

(22) Filed: Dec. 6, 2006

(65) Prior Publication Data

US 2008/0137664 A1 Jun. 12, 2008

(51) Int. Cl.
*H04J 3/02* (2006.01)

(52) U.S. Cl. ........ 370/462; 455/450; 455/453; 455/464; 370/229; 370/235; 370/310; 370/312; 370/314; 370/329; 370/345; 370/347; 370/390; 370/395.4; 370/406; 370/408; 370/431; 370/433; 370/437; 370/442; 370/447; 370/458; 370/461

(58) Field of Classification Search ................... None
See application file for complete search history.

(56) References Cited

U.S. PATENT DOCUMENTS 7,366,178 B2 * 4/2008 Lee et al. ................... 370/395.4

OTHER PUBLICATIONS

Wei et al., "Interference-Aware IEEE 802.16 WiMax Mesh Networks", May 2005, IEEE.*
Luo et al., "A New Model for Packet Scheduling in Multihop Wireless Networks", Aug. 2000.*

* cited by examiner

*Primary Examiner* — Daniel J Ryman
*Assistant Examiner* — Aixa A Guadalupe
(74) *Attorney, Agent, or Firm* — Carlson, Gaskey & Olds PC

(57) ABSTRACT

An alternating scheduling algorithm is useful in a mesh network. Transmissions are scheduled along a branch in a tree structure such that simultaneous transmissions occur only in non-adjacent layers along the branch. In a disclosed example, every other layer is grouped into a set of layers such that the sets are mutually exclusive and the sets only include non-adjacent layers. One example includes designating one set of layers as the even layers and another set as odd layers. A scheduler schedules transmissions on the layers such that simultaneous transmissions along a branch occur only on layers within one of the sets while transmissions on the other set along the same branch are prevented. The sets of layers selected for transmission are alternated each subsequent scheduling window or frame.

18 Claims, 2 Drawing Sheets

ALTERNATING SCHEDULING METHOD FOR USE IN A MESH NETWORK

TECHNICAL FIELD

This invention generally relates to communications. More particularly, this invention relates to communications in a mesh network.

DESCRIPTION OF THE RELATED ART

A variety of communication networks are known. Multiple hop wireless mesh networks are promising candidates for providing ubiquitous, high-speed wireless access to customers. Example uses for such mesh networks include broadband home networking, community and neighborhood networks or enterprise networking. The original IEEE 802.16 standard addressed applications in licensed bands in the frequency range from 10 to 66 GHz using a point-to-multipoint (PMP) mode. Subsequent amendments have extended the 802.16 air interface standard to cover non-line of sight applications in licensed and unlicensed bands in the range below 11 GHz. Amendments to the 802.16 standard have also added a mesh mode.

Compared to using a PMP mode, a mesh mode has several distinguishing characteristics. In a mesh mode, traffic can occur directly between subscriber stations. In mesh mode, traffic may be relayed by internal nodes (in uplink and downlink directions) so that bandwidth allocation may cover more than one frame time slot. The topology of a mesh network may change more dynamically compared to that in PMP mode.

Some research results have shown that throughput capacity can be increased by deploying relaying nodes. One of the biggest challenges in building a wireless mesh network, however, is how to handle scheduling schemes to achieve guaranteed performance. Scheduling schemes must address both throughput and delay, for example. Although centralized scheduling using coordinated and non-coordinated distributed scheduling are mentioned in the IEEE 802.16-2004 standard, no detailed definitions are provided.

It is not possible to simply employ PMP scheduling techniques in a mesh network. Algorithms used in PMP mode are not suitable for mesh mode because they all deal with centralized scheduling in a one hop range. Algorithms deployed in ad-hoc networks are applied in distributed networks, which lack the centralized scheduling control.

There is a need for a scheduling technique for use in mesh networks. This invention addresses that need.

SUMMARY

An exemplary method of communicating is useful in a mesh network including a tree having at least one branch between a root node and a child node. At least one link is at each of a plurality of layers between the nodes. Each link facilitates communications between a node and at least one next node along the branch. The exemplary method comprises scheduling transmissions between selected nodes such that simultaneous transmissions occur only on non-adjacent layers along the branch.

One example includes alternating the scheduling on the layers so that a layer on which a transmission occurs during one scheduling window does not include a transmission during a next, subsequent scheduling window and a layer on which there was no transmission during the one scheduling window will include a transmission during the next, subsequent scheduling window. Repeatedly alternating which layers include transmissions facilitates serving a selected amount of traffic while avoiding interference and reducing a time required for servicing the traffic.

An exemplary mesh network assembly includes a tree having at least one branch between a root node and a child node. At least one link is at each of a plurality of layers between the nodes. Each link facilitates communications between a node and at least one next node along the branch. A scheduler is configured to schedule transmissions between selected ones of the nodes such that simultaneous transmissions occur only on non-adjacent layers along the branch.

The various features and advantages of this invention will become apparent to those skilled in the art from the following detailed description. The drawings that accompany the detailed description can be briefly described as follows.

DETAILED DESCRIPTION

The following examples demonstrate how an embodiment of this invention applies an alternating scheduling technique to schedule communications on non-adjacent layers in a mesh network. One advantage of the disclosed examples is that they minimize the amount of time required for a given amount of traffic to reach its intended destination.

Figure 1:
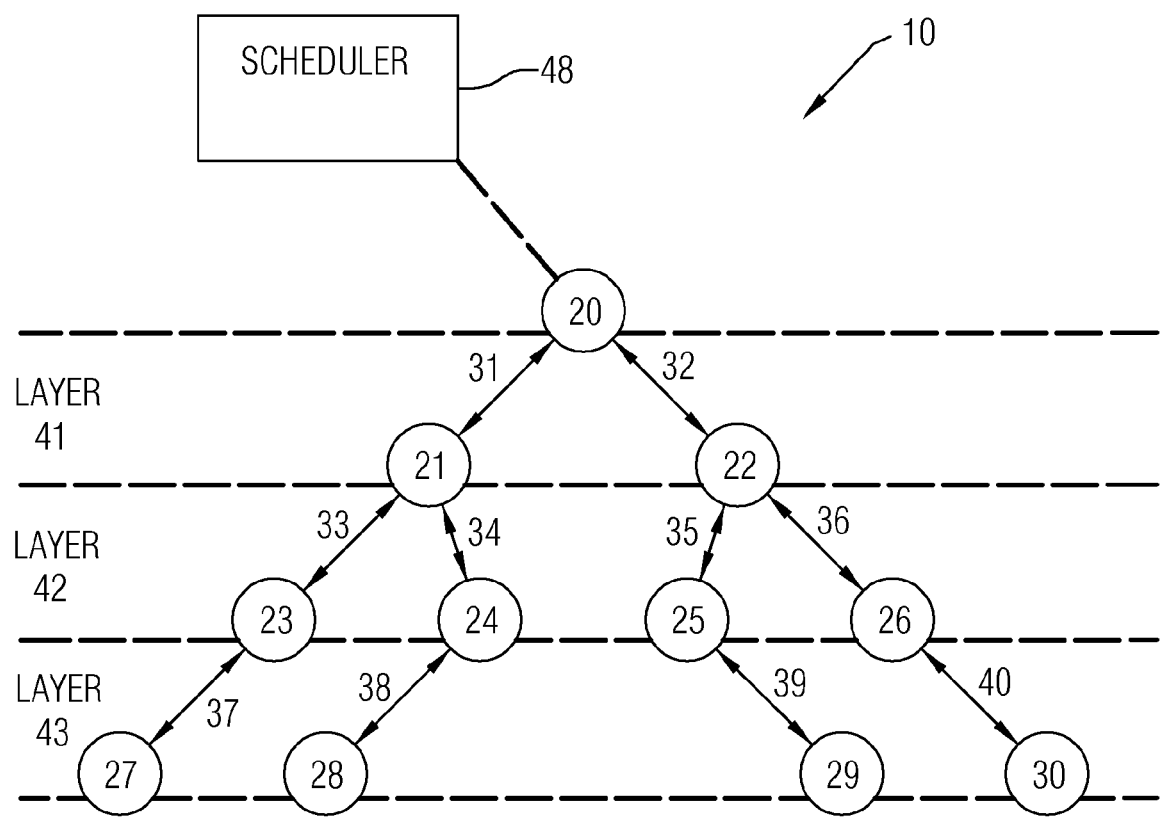
FIG. 1 schematically shows selected portions of a mesh network with which an embodiment of this invention is useful.

FIG. 1 schematically shows an example mesh network 10. In the illustration, a tree structure has been established through message exchanging. Having a tree structure facilitates centralized scheduling using an embodiment of this invention. This example includes a root node 20, which in one example is a base station used for wireless communications between a mobile station and a wireless network, for example. A plurality of child nodes 21-30 depend from or are associated with the root node 20. In one example, the child nodes 21-30 comprise subscriber stations that are capable of communicating with each other according to known mesh network techniques.

The example tree structure of FIG. 1 includes a hierarchical structure originating at the root node 20 and extending along various levels that each includes at least one node. For example, nodes 21 and 22 are at a first level depending from the root node 20. Nodes 23, 24, 25 and 26 are at a next level depending from the nodes 21 and 22. Nodes 27, 28, 29 and 30 are at a next level depending from the nodes 23-26.

The example tree structure includes two branches originating from the root node 20. A first branch includes a link 31 between the root node 20 and the child node 21, a link 33 between the child node 21 and the child node 23 and a link 37 between the child node 23 and the child node 27. Another segment along the first branch in the illustrated example includes a link 34 between the child node 21 and the child node 24 and a link 38 between the child node 24 and the child node 28.

A second branch originates from the root node 20 including a link 32 between the root node 20 and the child node 22. Another portion of the second branch includes a link 35 between the child node 22 and the child node 25 and a link 39 between the child node 25 and the child node 29. Another portion of the second branch in the illustrated example includes a link 36 between the child node 22 and the child node 26 and a link 40 between the child node 26 and the child node 30.

In the illustrated example, the links between the nodes at the different levels within the mesh network 10 can be grouped according to layers corresponding to the number of levels of nodes from the root node 20, for example. The illustrated example includes a first layer 41 that includes the links 31 and 32, a second layer 42 that includes the links 33, 34, 35 and 36 and a third layer 43 that includes the links 37, 38, 39 and 40. In this example, the layer 41 is adjacent the layer 42 because the two layers share at least one common node, the child nodes 21 and 22 in this example. The layer 42 is adjacent the layer 43 because they share the common nodes 23, 24, 25 and 26. For purposes of discussion, layers are considered adjacent when a link from each such layer is connected with a common node level. For example, there is only one child node 21 between the links 31 and 33 and the layers 41 and 42 are considered adjacent layers.

Figure 2:
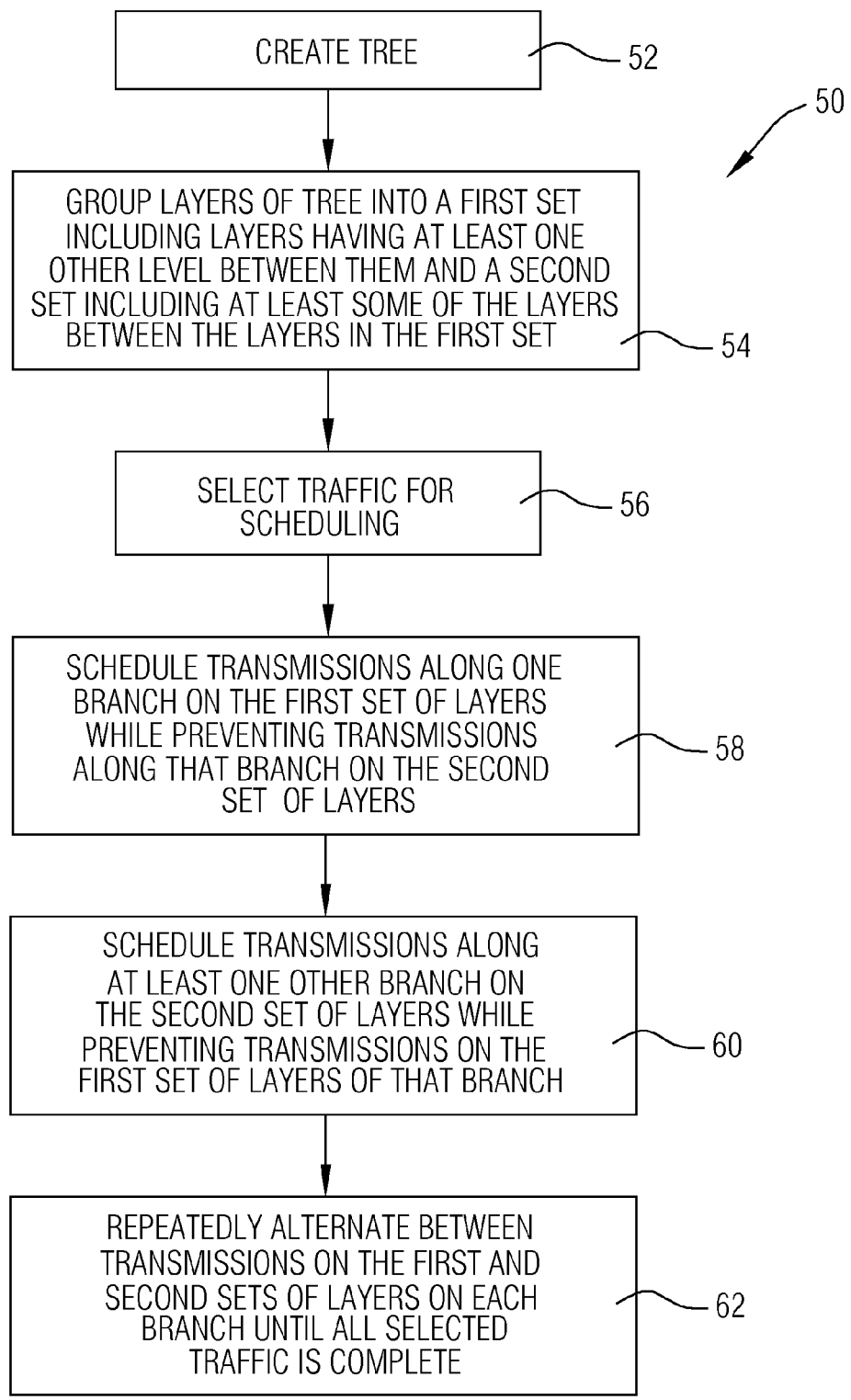
FIG. 2 is a flowchart diagram summarizing one example approach.

A scheduler 48 schedules communications among the nodes by selecting only certain layers for transmissions during certain scheduling windows. The flowchart diagram 50 of FIG. 2 summarizes one example approach. The tree structure schematically shown in FIG. 1 is created at 52 using known messaging techniques.

In mesh network examples where the IEEE 802.16-204 standard is used, only time division (TDD) mode is supported for such a mesh network. Additionally, in such examples the MAC layer is assumed to schedule data to multiple access (e.g., using time division multiple access) through a single carrier channel. In such examples, a frame in each link can be built once the bandwidth allocation result is determined.

For purposes of discussion, we consider an example that has several governing principles or rules. The first of these is that any node within the mesh network cannot transmit and receive at the same time. The second is that relaying data traffic received by one subscriber station cannot be transferred immediately to its neighbor in the same frame slot. This is because the subscriber station usually has performance constraints such as buffer writing and reading. A third rule is that nodes within the transmission range of an active node are blocked to avoid interference. A fourth rule is that any two nodes that are not interfering with each other can potentially transmit data packets over the physical channel simultaneously.

It is believed that interference between concurrent transmissions from neighboring nodes is one of the most significant factors that limit system throughput and scalability for wireless multi-hop networks. Directional antennae at the transmitters and receivers can minimize transmission ranges of the nodes and applying the fourth rule mentioned in the previous paragraph is useful in some examples for improving the throughput of the mesh network.

In examples where all nodes share a wireless channel and communicate on that channel, each node is assumed to be equipped with multiple directional antennas. A directional antenna, as known, can transmit or receive over a small angle (e.g., 45°) centered on the receiver or transmitter, respectively. Further, several directional antennas may be used together to cover all directions. For purposes of discussion, we assume that there is no interference at angles beyond the prescribed beam width of a directional antenna or at distances beyond 10% of the transmitter-to-receiver link length.

Directional transmissions over two different links will interfere at the two receiving access points if the access points are located within the beam of the other link. Transmissions by two or more links will interfere at the same received node even if different directional antennas at the node receive these transmissions. This assumption is justified, for instance, in the case where signals received by all antennas are combined before sending to the receiving circuitry. The tree structure is arranged to avoid such interference. Another type of interference will occur when two nodes simultaneously transmit to a common receiving node. We also assume, for purposes of discussion, that simultaneous transmissions by the same node in different directions are not allowed.

The following notations are useful for discussion purposes. Consider, for example, an access tree $T=(V, E)$, where the nodes V are access points, the links E are bidirectional wireless links between neighboring pairs of access points and $|V|=N$. All nodes in V are labeled with an integer i and the root node is labeled with 0. The root node 0 is a base station in one example, and the other nodes $i \epsilon V - \{0\}$ are subscriber stations The routing tree can be considered to have L layers and B branches. A Mask (b) for $B=1 \ldots B$ represents the set of candidate active links in the $B^{th}$ branch that have the opportunity to transmit or receive data during a particular scheduling window.

The links can be represented by I where $I^b_0$ represents the link connecting the root node 20 in the $B^{th}$ branch. For all other nodes, $I^c_i$ denotes the link between node i and its neighboring child nodes. For example, in the tree structure shown in FIG. 1, the link set for each node can be described using $I^{21}_0=\{31\}$, $I^{22}_0=\{32\}$; $I^c_{21}=\{33, 34\}$, $I^c_{22}=\{35,36\}$, ..., $I^c_{30}=\Phi$.

According to the example of FIG. 2, the layers in the tree are grouped into a first set having at least one other layer between them and a second set including at least some of the layers that are between the layers in the first set. This is shown at 54. In one example, the first set includes every other layer while the second set includes the rest of the layers, which are every other layer to each other. In the example of FIG. 1, the layers 41 and 43 are included in a first set while the layer 42 is included in a second set.

In the case of FIG. 1, it is possible to designate the layers 41 and 43 as odd layers and the layer 42 as an even layer. In this example, the first set and second set comprise odd layers and even layers, respectively. Each set in this example includes every other layer and the layers within each set are mutually exclusive of the other set. In other words, none of the layers within the first set are included in the second set.

Using two sets is useful in an example like FIG. 1 where two branches originate from the root node 20. Using two sets allows for alternating between the sets of layers for scheduling transmissions within scheduling windows (e.g., frames).

In FIG. 2, traffic is selected for scheduling at 56 and the scheduling process begins according to the topology of the routing tree, which has no relation with the bandwidth request of internal nodes. One example includes using an adjacency matrix to calculate possible candidate active link sets. One example includes considering a tree structure from left to right.

In each branch of the example of FIG. 1, all of the links in the odd layers 41 and 43 can be gathered as active candidates within the same scheduling window. At the same time, all of the links within the even layer 42 are not active candidates. Similarly, when all of the links in the even layer 42 are considered active candidates for a particular scheduling window, the links in the odd layers 41 and 43 are not considered active candidates. One example includes generating a table of the candidate link sets that describes the relationships between the different layers for different scheduling windows.

The example of FIG. 2 includes scheduling transmissions along one branch on a first set of layers (e.g., even layers) while preventing transmissions along that branch on a second set of layers (e.g., odd layers) at 58. At the same time, at 60, transmissions are scheduled along another branch on the second set of layers while preventing transmissions on the first set of layers of that branch.

In the illustrated example of FIG. 1, there are two branches and they may be scheduled simultaneously in a manner that allows for the links in the odd layers 41 and 43 along the first branch including the link 31 to transmit during a scheduling window and the links in the even layer 42 along the second branch including the link 32 to transmit during the same scheduling window. This is possible because the transmissions along the two branches will not cause interference with each other because they are not directed to the same nodes even though links in adjacent layers may be transmitting simultaneously. For example, a transmission along the links 37, 31 and 36 can all occur simultaneously within a single scheduling window without causing any interference.

In this example, therefore, the candidate links within each layer for a particular scheduling window will vary depending on the branch to which those links belong. In other words, any link in an odd layer along the first branch may be active during a scheduling window and any links in any even layers along the first branch will be inactive during that same scheduling window. At the same time, any links in any odd layers along the second branch will be inactive during that scheduling window and any links in any even layers along the second branch will be active during that same scheduling window.

The scheduler 48 is configured in one example to alternate which layers are active during each subsequent scheduling window. This is shown at 62 in FIG. 2. For example, where $I^b_0$, b=1, . . . , B is served by round-robin and only two branches are rooted from the root node, the odd and even layers are activated alternately in sequence from the point of view of each branch. The example technique, therefore, can be referred to as an odd-even alternating scheduling algorithm.

Referring again to FIG. 1, when $I^{21}_0$ is served, all odd layers along that branch are active and all even layers along the other branch are active, simultaneously. When $I^{22}_0$ is served, all odd layers along the branch including the link 32 are active and any even layers along the other branch are active, simultaneously. For example, one scheduling window will include the layers 41 and 43 being active along the first branch including the link 31 such that the links 31, 37 and 38 are active candidates while the links 33 and 34 are inactive and no transmissions are permitted along the latter two links because they are in the even layer 42. At the same time, the links 35 and 36 within the even layer 42 are active candidates because they are part of the second branch including the link 32. The links 32, 39 and 40 are not active candidates at that time because they are in the odd layers 41 and 43 of the second branch. The active and inactive candidates are then switched or alternated for the next subsequent scheduling window (e.g., frame). By repeatedly alternating which links are active candidates, the example scheduling technique facilitates efficiently servicing a selected amount of traffic among the nodes 20-30.

One example includes establishing mask values that govern these two scenarios. The first scenario is described using the mask value $I^{21}_0$={31}, $Mask^o$ (1)={37, 38}, $Mask^e$ (2)={35, 36}. The second scenario described above can be indicated by the mask value $I^{22}_0$={32}, $Mask^e$ (21)={33, 34}, $Mask^o$ (22)={39, 40}.

In one example, once the mask is established, three basic policies govern the bandwidth request. First, only links listed in the mask set get the opportunity to transmit during a particular scheduling window. All other links are blocked to prevent any transmissions on those links during that scheduling window. Second, if more than one candidate link is listed in $I^c_i$ in the mask set, the serving order follows the sequence of bandwidth request of these links. Generally speaking, the links connecting with leaf nodes are queued ahead of internal links. For any links in the same layer, the serving order is selected along a particular direction (e.g., from left to right in the drawing). Third, for each link that gets the opportunity to transmit, regardless of whether it is listed in $I^b_0$ or $I^c_i$, downlink traffic is served first from high priority to low priority followed by uplink traffic allocated if there is remaining bandwidth, also following the sequence from high priority to low priority.

One example includes a centralized scheme according to the IEEE 802.16 standard. In the centralized schedule of IEEE 802.16-204, for example, every mesh node that is a subscriber station sends a resource request to the mesh root node. The root node determines the amount of granted resources for each link. The request and grant process use a mesh centralized scheduling (MSH-CSCH) message. According to the definition in the standard, during a scheduling validity, the resource allocation is the same in each frame. One example embodiment of this invention includes modifying the MSH-CSCH message to work with the example alternating scheduling technique in which the burst profile of each frame inside a scheduling validity may be varied. In one example, an 8-bit scheduling validity field is added to indicate the total frame slots during one scheduling. In one example, a downlink burst profile in an $i^{th}$ frame occupies 4 bits while an uplink burst profile in the $i^{th}$ frame occupies 4 bits of the scheduling validity field. This allows for using known portions of the IEEE 802.16 standard.

The disclosed examples allow for a sufficient spectral utilization and high throughput in a mesh network. The interference-aware, centralized scheduling technique has a high concurrence rate. In one example, high, middle and low priority services are defined. Downlink traffic is serviced first beginning with high priority and ending with low priority services. At the same time, as many as possible interference-free opportunities for uplink transmissions are scheduled, again serving high priority before low priority. Serving downlink traffic first is advantageous because a root node is typically in charge of all the internal and external data exchanging in the tree structure. Accordingly, the root node should relay downlink packets as soon as possible to avoid buffer overflow and guarantee latency requirements. For uplink services, traffic may be stored and buffered temporarily in internal subscriber station nodes along a transmission path where it can wait for suitable opportunity to be relayed to the root node of the mesh network.

In one example, the downlink traffic is served first along each branch according to the sequence of round-robin, which operates in a known manner. Only one packet buffer is needed in each node for downlink since the download traffic will be transmitted hop-by-hop until arrival at the destination node, which means the relayed downlink packet will be transmitted immediately in the next scheduling window (e.g., frame). At the same time, links in non-adjacent layers are activated alternately.

For uplink service, packets can be buffered among different priority queues inside each child node (e.g., subscriber station). Service order in each queue follows the request order from leaf to root. In the example of FIG. 1, the nodes 27, 28, 29 and 30 may be considered leaf nodes. A mask as described above provides instructions for constructing an uplink subframe using the available packets in the priority queues. Such a process is repeated until all the uplink and downlink traffic is served based on the amount of traffic selected for scheduling.

The example techniques provide alternating scheduling among layers in a mesh network in a manner that avoids interference, reduces an amount of time that it takes to service a selected amount of traffic and reduces latency associated with servicing such traffic. The example techniques provide high concurrent transmission under centralized scheduling and enhance distributed scheduling by eliminating message exchange for hand-shaking. Compared with basic first in, first out serving modes, for example, the example techniques can save half of the centralized scheduling validity time under different traffic loads and reduce half of the average latency for services with different priorities. Additionally, the disclosed examples are believed to be better compatible with various traffic distributions and maintain stable scheduling validity even when uplink and downlink traffic proportions vary. Another advantage of the disclosed techniques is that they are relatively low in complexity and relatively easy to implement in a mesh network.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating in a mesh network including a tree having at least one first branch between a root node and a first child node with at least one link at each of a plurality of layers between the nodes, each link facilitating communications between a node and at least one next node along the branch, the network including at least a second branch from the root node to a second child node, the method comprising
scheduling transmissions between selected nodes such that simultaneous transmissions occur only on non-adjacent layers along each of the first and second branches, respectively and such that simultaneous transmissions occur on layers of the first branch that are different than the layers on which transmissions occur along the second branch during a single scheduling window.

2. The method of claim 1, comprising scheduling the transmissions such that the simultaneous transmissions occur only on every other layer along the each of the first and second branches, respectively.

3. The method of claim 1, comprising
designating at least one of the layers an even layer;
designating at least one layer adjacent the at least one even layer an odd layer;
scheduling the transmissions such that at least one transmission on any even layer of the first branch occurs within a scheduling window; and
preventing any transmissions on any odd layer of the first branch during the scheduling window.

4. The method of claim 3, comprising
scheduling the transmissions such that at least one transmission on any odd layer of the first branch occurs within a next scheduling window; and
preventing any transmissions on any even layer of the first branch during the next scheduling window.

5. The method of claim 4, comprising
scheduling the transmissions such that at least one other transmission occurs within a next subsequent scheduling window on any layer of the first branch that did not include any transmissions during a previous scheduling window; and
preventing any other transmissions within the next subsequent scheduling window on any of the layers of the first branch that included a transmission during the previous scheduling window.

6. The method of claim 5, comprising
repeatedly performing the scheduling and preventing of the other transmissions during any following next subsequent scheduling window until a selected number of transmissions along the first branch are completed.

7. The method of claim 1, comprising
designating at least one of the layers an even layer;
designating at least one layer adjacent the at least one even layer an odd layer;
scheduling the transmissions such that at least one transmission on at least one of the even layers of the first branch occurs within a scheduling window;
preventing any transmissions on any of the odd layers of the first branch during the scheduling window
scheduling the transmissions such that at least one transmission on at least one of the odd layers of the second branch occurs within the scheduling window; and
preventing any transmissions on any of the even layers of the second branch during the scheduling window.

8. The method of claim 7, comprising
scheduling the transmissions such that at least one transmission on at least one of the odd layers of the first branch occurs within a next scheduling window;
preventing any transmissions on any of the even layers of the first branch during the next scheduling window;
scheduling the transmissions such that at least one transmission on at least one of the even layers of the second branch occurs within a next scheduling window; and
preventing any transmissions on any of the odd layers of the second branch during the next scheduling window.

9. The method of claim 8, comprising
scheduling the transmissions such that at least one other transmission occurs during a next subsequent scheduling window on any of the layers that did not include a transmission during a previous scheduling window;
preventing any other transmissions within the next subsequent scheduling window on any layers that included a transmission during the previous scheduling window.

10. The method of claim 9, comprising
repeatedly performing the scheduling and preventing of the other transmissions during any following next subsequent scheduling window until a selected number of transmissions along at least one of the branches are completed.

11. The method of claim 1, comprising
scheduling any downlink transmissions in a direction from the root node to any one of the child nodes before scheduling any uplink transmissions in an opposite direction.

12. A mesh network assembly, comprising
a tree having at least one first branch between a root node and a first child node and at least one second branch between the root node and a second child node with at least one link at each of a plurality of layers between the nodes, each link facilitating communications between a node and at least one next node along the corresponding branch; and a scheduler configured to schedule transmissions between selected one of the nodes such that simultaneous transmissions occur only on non-adjacent layers along each of the branches, respectively, the scheduler configured to schedule transmissions such that simultaneous transmissions occur only on non-adjacent layers of the second branch that are different than the layers on which transmissions occur along the first branch during a selected scheduling window.

13. The assembly of claim 12, wherein the scheduler is configured to schedule the transmissions such that the simultaneous transmissions on at least one of the branches occur only on every other layer along the at least one of the branches.

14. The assembly of claim 12, wherein the scheduler is configured to
    designate at least one of the layers an even layer;
    designate at least one layer adjacent the at least one even layer an odd layer;
    schedule the transmissions such that at least one transmission on any even layer of the first branch occurs within the selected scheduling window;
    prevent any transmissions on any of the odd layers of the first branch during the scheduling window;
    schedule the transmissions such that at least one transmission on any odd layer of the first branch occurs within a next scheduling window; and
    preventing any transmissions on any of the even layers of the first branch during the next scheduling window.

15. The assembly of claim 14, wherein the scheduler is configured to
    schedule the transmissions such that at least one other transmission occurs within a next subsequent scheduling window on a layer of the first branch that did not include any transmissions during a previous scheduling window; and
    prevent any other transmissions during the next subsequent scheduling window on any of the layers of the first branch that included any transmission during the previous scheduling window.

16. The assembly of claim 15, wherein the scheduler is configured to
    repeat the scheduling and preventing of the other transmissions during any following next subsequent scheduling window until a selected number of transmissions along the first branch are completed.

17. The assembly of claim 12, wherein the scheduler is configured to
    designate at least one of the layers an even layer;
    designate at least one layer adjacent the at least one even layer an odd layer;
    schedule the transmissions such that at least one transmission on at least one of the even layers of the first branch occurs within the selected scheduling window;
    prevent any transmissions on any of the odd layers of the first branch during the scheduling window
    schedule the transmissions such that at least one transmission on at least one of the odd layers of the second branch occurs within the scheduling window; and
    prevent any transmissions on any of the even layers of the second branch during the scheduling window.

18. The assembly of claim 17, wherein the scheduler is configured to
    schedule the transmissions such that at least one other transmission occurs within a next subsequent scheduling window on a layer of each of the branches that did not include any transmissions during a previous scheduling window;
    prevent any other transmissions during the next subsequent scheduling window on any of the layers of each of the branches that included any transmission during the previous scheduling window; and
    repeat the scheduling and preventing of the other transmissions during any following next subsequent scheduling window until a selected number of transmissions along the branch are completed.

* * * * *